United States Patent [19]

Zawidzki

[11] 4,314,952
[45] Feb. 9, 1982

[54] PROCESS OF PREPARING SINTERED URANDIUM DIOXIDE PELLETS

[75] Inventor: Tadeusz W. Zawidzki, Ottawa, Canada

[73] Assignee: Eldorado Nuclear Limited, Canada

[21] Appl. No.: 32,693

[22] Filed: Apr. 23, 1979

[30] Foreign Application Priority Data

Apr. 28, 1978 [GB] United Kingdom ............... 17091/78

[51] Int. Cl.³ .......................................... G21C 21/00
[52] U.S. Cl. ..................................... 264/0.5; 423/261
[58] Field of Search ......................... 264/0.5; 423/261

[56] References Cited

U.S. PATENT DOCUMENTS 3,087,781  4/1963  Levey, Jr. et al. ................. 423/261
3,342,562  9/1967  St. Pierre ............................ 423/261
3,923,933  12/1975 Lay ..................................... 423/261

FOREIGN PATENT DOCUMENTS 686364  5/1964  Canada ................................ 264/0.5
870116  6/1961  United Kingdom ................ 423/261

Primary Examiner—Edward A. Miller
Attorney, Agent, or Firm—Wenderoth, Lind & Ponack

[57] ABSTRACT

Sintered uranium dioxide pellets suitable for power reactor use are described, and a process for their manufacture. This process involves incorporating a small amount of sulphur into the uranium dioxide before sintering, as a consequence large grain sizes are found in the pellets. The increase in grain size results in an improvement in overall efficiency when such pellets are used in a power reactor.

7 Claims, 1 Drawing Figure

PROCESS OF PREPARING SINTERED URANDIUM DIOXIDE PELLETS

BACKGROUND OF THE INVENTION

This invention relates to the preparation of uranium dioxide, particularly in the form of pellets as used in nuclear reactors for electrical power generation purposes.

DESCRIPTION OF THE PRIOR ART

Uranium dioxide, $UO_2$, is the fuel most commonly used in present day nuclear power reactors. In its final form, as used in the fuel elements, the $UO_2$ must meet stringent chemical and density specifications, which are set by the nuclear industry to allow efficient and economical operation of the power reactors.

The most common method used to obtain the high densities required in the pellets used in reactor fuel elements, which desirably is greater than 95% of the theoretical density for $UO_2$ in bulk, is by pressing a $UO_2$ powder into pellets, and then sintering these pellets in a hydrogen atmosphere at a temperature of at least 1600° C. Even under these stringent conditions, the $UO_2$ powder used generally has a very fine particle size if pellets which meet the desired density limits are to be met.

There are a number of different methods in use for producing $UO_2$ power of very fine particle size. The method most commonly used is by the hydrogen reduction of a material commonly called both ammonium diurante, and ammonium uranate, which is a solid having a formula approximating to $(NH_4)_2U_2O_7$. It is also known by the acronym ADU. ADU for this purpose is generally obtained by precipitation from solution by reacting ammonia, or ammonium hydroxide with a solution of uranyl nitrate or uranyl fluoride. The ADU formed by this procedure has a very fine particle size which carries through into the final, sintered, $UO_2$ pellet.

This process is not without its disadvantages. An improved process for obtaining $UO_2$ capable of providing sintered pellets having a higher density is described in our South African Pat. No. 76.1302, issued August, 1977. In this Patent is described a process for the preparation of fine particle size uranium dioxide from a uranium trioxide feed comprising the steps of:

(a) reacting solid uranium trioxide with aqueous ammonium nitrate to form an insoluble ammonium uranate (it is to be noted that although described in the same language, this precipitated material is chemically different to that mentioned above: its formula is generally $6UO_3.2NH_3.5H_2O$);

(b) neutralizing the thus formed slurry with ammonium hydroxide to precipitate out as an insoluble ammonium uranate the remaining dissolved uranium;

(c) recovering the thus formed precipitates in a dry state; and (d) reducing the dried precipitate to uranium dioxide.

The thus obtained dioxide can then be converted into pellets and sintered, to provide a pellet having density above 10.64 gm/cc, that is better than 97% of the theoretical density of 10.96 gm/cc.

SUMMARY OF THE INVENTION

However, it is now known that producing a $UO_2$ pellet having a high density is not the only criterion of relevance, although it is an important one. It has now been discovered that the size of the grains present in such pellets, which can be observed and measured, after applying appropriate sectioning techniques to a pellet, with an optical microscope, has an effect on their efficiency, in terms of reactor power output, when used as fuel in a nuclear power generating reactor. It has now been realized that the grains size present in the sintered pellets has an effect on the rate of loss of fission by-products from the pellet. Studies have shown that if the grains size of the $UO_2$ present in the sintered pellets could be increased to a figure significantly higher than the presently larger known grains, which have a size of about 25 to 30 microns, then an increase in overall power output efficiency should result of the order of 5 to 10%.

We have now discovered a simple process whereby an acceptable sintered $UO_2$ pellet may be made which not only has a suitably high density, and thus is acceptable as a reactor fuel, but also has an internal grains size considerably larger than has hitherto been possible.

BRIEF DESCRIPTION OF THE DRAWINGS

The attached single FIGURE shows diagrammatically the relationship between grain size and green pellet sulphur content.

DESCRIPTION OF THE PREFERRED EMBODIMENTS

Figure 1:
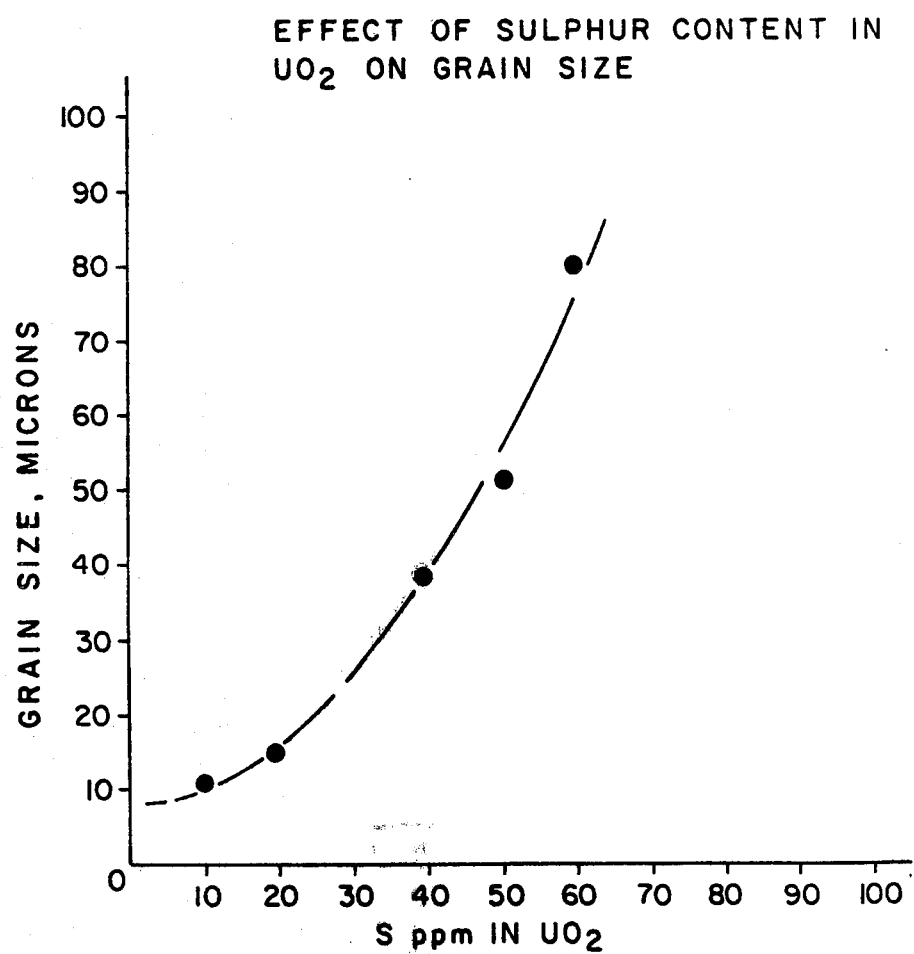

Thus in a first aspect this invention comprises a sintered, high density uranium dioxide pellet composed of grains having a size in excess of 50 microns.

In a preferred aspect, this invention comprises a sintered, high density uranium dioxide pellet composed of grains having a size range of from 50 microns to 1,000 microns.

The process of this invention utilizes most of the process steps which are outlined above, and disclosed in our South African Pat. No. 76.1302, with the addition of one simple, but important step. This step is to provide as the initial feed a uranium trioxide material containing a known and controlled amount of sulphur. By this means, a uranium dioxide product is obtained which, before sintering exhibits a fine particle size which enables the preparation of a high density sintered product and which exhibits an increase in grains size during the sintering procedure.

Thus in a second aspect this invention provides a process for the preparation of a sintered, high density, large grains size uranium dioxide pellet which comprises the steps of:

(i) reacting a uranyl nitrate of formula $UO_2(NO_3)_2 6H_2O$ with a sulphur source, at a temperature of about 300° C. to about 400° C. to provide a sulphur-containing uranium trioxide;

(ii) reacting the thus obtained modified uranium trioxide with ammonium nitrate to form an insoluble sulphur-containing ammonium uranate;

(iii) neutralizing the thus formed slurry with ammonium hydroxide to precipitate out as an insoluble ammonium uranate the remaining dissolved uranium;

(iv) recovering the thus formed precipitate in the dry state;

(v) reducing the dry precipitate to $UO_2$ and forming it into green pellets; and (iv) sintered the thus obtained pellets in a hydrogen atmosphere at an elevated temperature.

In most of these steps, the conditions are not critical, and the manner in which the various operating parameters may be varied is fully discussed in our South African Pat. No. 76.1302. But in respect of steps (i), (v) and (vi) other considerations apply, since the amount of sulphur, expressed as elemental sulphur, present in the uranium dioxide at the green, unsintered pellet stage has a direct relationship to the grains size obtained in the pellet after sintering. As can be seen from the graphical representation in the attached FIGURE, increase in the sulphur content, expressed as elemental sulphur, in the green pellets increases the grains size in the final pellets, under standardized sintering conditions. Indeed we have found that by the addition of sulphur in this fashion grains sizes in the range of 50 microns up to 1,000 microns are obtainable.

The critical point in the process of this invention at which the sulphur content must be controlled is at the green pellet stage. A preferred range of sulphur content, expressed as elemental sulphur, at that point in the process is from about 20 ppm by weight, to about 1,000 ppm by weight. At this level of addition a grains size in the final pellet of up to 1,000 microns can be achieved. Clearly a lower level of sulphur will only provide a grains size toward the lower end of this range: reference is again made to the attached FIGURE.

However, the only point in the process at which it is feasible to control the sulphur content is at the beginning, in step (i) as detailed above. It is our experience that in proceeding through steps (i) to (iv), that is from the initial uranyl nitrate feed to an unsintered green pellet, about 75% of the sulphur initially added is lost. It also appears that a scale factor is involved: in small scale laboratory work less sulphur seems to be lost than in larger scale industrial work. Thus it usually will be necessary to establish, by way of experiment, exactly what level of sulphur compound requires to be reacted initially in order to achieve a specified desired level of sulphur in the green pellets, and hence a specified grains size range in the sintered pellets. In our own operations we have found the losses to be of the order of 75% and hence if it is desired to have a sulphur level of 100 ppm in the green unsintered pellets, an addition of 400 ppm requires to be made initially.

The form in which the sulphur is added to the uranyl nitrate in step (i) is not critical, and it can be chosen from a wide range of materials. However in its choice, it must also be remembered that some of the sulphur will persist through the sintering stage into the final pellets. Therefore substances containing sulphur which would interfere either with the chemistry leading to the uranium dioxide used in making the pellets, or in the pressing and sintering operation, or would cause problems when the pellets are used in a reactor, have to be avoided. A reagent which is easily available and meets all of these criteria is sulphuric acid, and hence this is the reagent we prefer to use.

The following general comments apply to all of the subsequent examples.

(a) URANYL NITRATE

The nuclear grade uranyl nitrate used had the following chemical analysis:

| Impurity | Maximum | Typical |
|---|---|---|
| Ag | 1.0 | 0.1 |
| B | 0.2 | 0.15 |
| Cd | 0.2 | <0.2 |
| Cr | 10 | 5 |
| Cu | 50 | 1 |
| Fe | 30 | 25 |
| Mn | 5 | <1 |
| Mo | 1 | 0.5 |
| Ni | 15 | 5 |
| P | 50 | 10 |
| Si | 20 | <10 |
| Th | 50 | 30 |
| V | 30 | <10 |

These levels are in ppm on uranium present basis.

(b) AMMONIUM NITRATE AND AMMONIA

These were prepared from reagent grade materials. When recycle ammonium nitrate is used both the pH and concentration were adjusted, if need be, by conventional procedures.

(C) URANIUM DIOXIDE ASSESSMENT

The method used was to press the uranium dioxide powder to form green pellets, and then sinter these pellets in a hydrogen atmosphere at a temperature of up to at least 1600° C. The pellets were then suitably sectioned, and the grains size assessed by means of an optical microscope as observed from the face of the section.

(D) EXPERIMENTAL PROCEDURE

The sulphur additions were carried out by adding a known amount of sulphur compound, generally as sulphuric acid, to uranyl nitrate, and then heating the mixture to a temperature of from about 300° C. to about 400° C. in order to decompose the uranyl nitrate to uranium trioxide.

The modified uranium trioxide thus produced was then added to a well agitated vessel containing ammonium nitrate solution at the desired temperature.

The pH of the slurry, recorded during the run, generally dropped to a minimum value in the range 2.5 to 4.0. After the required reaction time, either aqueous (28%) or anhydrous ammonia was added to the slurry. After the ammonia addition, the slurry was usually repulped for 5 to 30 minutes prior to filtering, in order to verify that the pH was not still decreasing.

Filtration was carried out at temperatures up to 70° C., generally above 50° C. After washing with hot water, the cake was dried at 110° C.

Finally, the product was baked, reduced, pelletted, and sintered in conventional production equipment.

Following this procedure a sequence of runs were made in which standardized processing and sintering conditions were used. The only variable changed was the amount of sulphur added. Inspection of the obtained sintered pellets gave the following results. The sulphur was added in step (i) as sulphuric acid.

TABLE 1

| Sulphur added, ppm | Sulphur content of green pellets, ppm | Pellet UO$_2$ particle size, microns |
|---|---|---|
| 40 | 10 | 11 |
| 80 | 20 | 15 |
| 160 | 40 | 38 |
| 200 | 50 | 41 |
| 240 | 60 | 80 |

Other experiments carried out under differing sintering conditions have shown that the presence of from 150 ppm to 300 ppm, of sulphur in the green pellets (measured as elemented sulphur) will provide grain sizes in the sintered pellets of from 500 to 700 microns. Under some sintering conditions grain sizes of up to at least 1,000 microns have been observed. The relevant variable in the sintering process appears to be the rate at which the green pellets are brought to sintering temperature. In the above Table the rate of rise was standardized at 200° C. per min. The use of a higher rate of rise leads to larger final grain sizes when a sulphur source is present in the green pellets.

What I claim as my invention is:

1. A process for the preparation of a sintered, high density, large grain size uranium dioxide pellet which comprises the steps of:
   (i) reacting a uranyl nitrate of formula $UO_2(NO_3)_2 \cdot 6H_2O$ with a sulphur source, at a temperature of from about 300° C. to about 400° C. to provide a sulphur containing uranium trioxide;
   (ii) reacting the thus-obtained modified uranium trioxide with ammonium nitrate to form an insoluble sulphur-containing ammonium uranate;
   (iii) neutralizing the thus-formed slurry with ammonium hydroxide to precipitate out as an insoluble ammonium uranate the remaining dissolved uranium;
   (iv) recovering the thus formed precipitates in a dry state;
   (v) reducing the dry precipitate to $UO_2$, and forming it into "green" pellets; and
   (vi) sintering the thus obtained pellets in a hydrogen atmosphere and at an elevated temperature.

2. Process according to claim 1, wherein the green pellets contain more than 200 ppm of a sulphur source, expressed as elemental sulphur.

3. Process according to claim 1 wherein the sulphur source used in step (i) is sulphuric acid.

4. Process according to claim 1 wherein an excess of sulphur source is used in step (i) over and above the level required in the "green" pellets obtained in step (v) thereby to compensate for sulphur losses from the sulphur-containing uranium oxides during steps (i) to (v) inclusive.

5. Process according to claim 1 wherein step (i) is carried out at an elevated temperature.

6. Process according to claims 1 or 3 wherein the step (i) is carried out at a temperature of from about 300° C. to about 400° C.

7. Process according to claim 1 wherein in step (vi) the rate at which the green pellets are brought to sintering temperature is adjusted to provide a desired grain size.

* * * * *